ALFRED ROTMAN,
    INVENTOR.

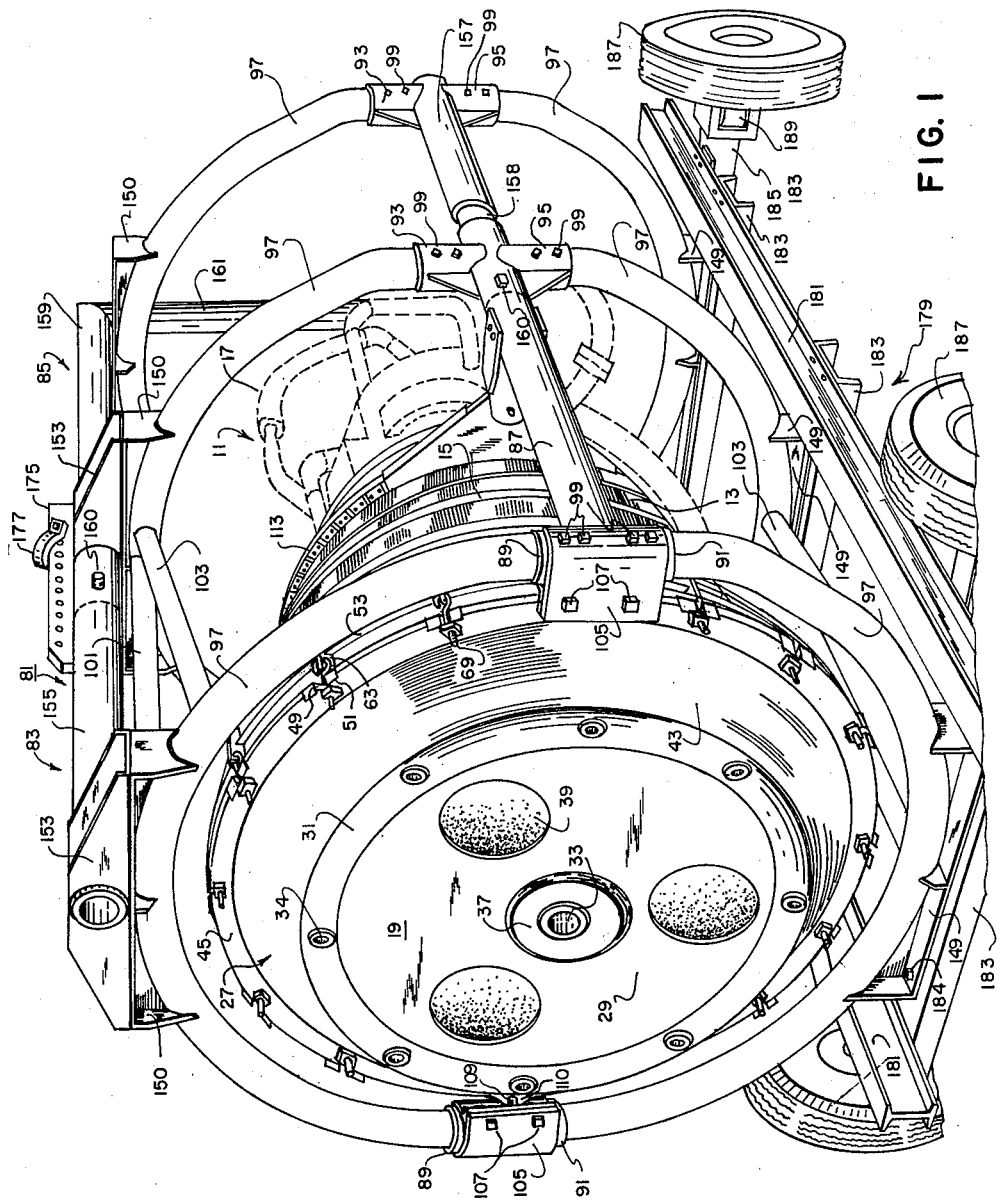
ALFRED ROTMAN,
INVENTOR.
BY
ATTORNEYS

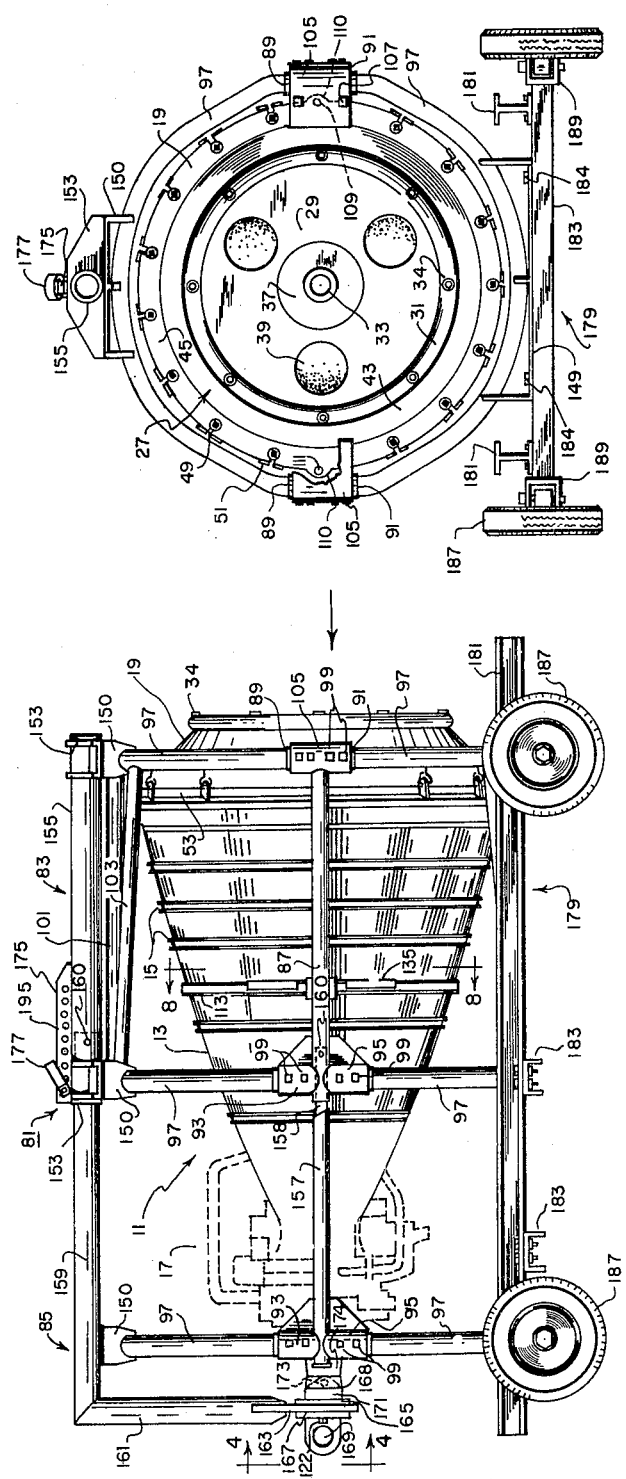
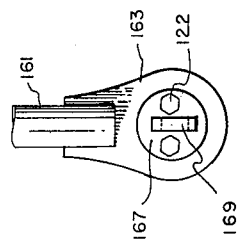

BY
    ATTORNEYS

July 13, 1965    JAMES E. WEBB    3,194,525
ADMINISTRATOR OF THE NATIONAL AERONAUTICS
AND SPACE ADMINISTRATION
SUPPORTING AND PROTECTING DEVICE
Filed Feb. 7, 1964    5 Sheets-Sheet 4
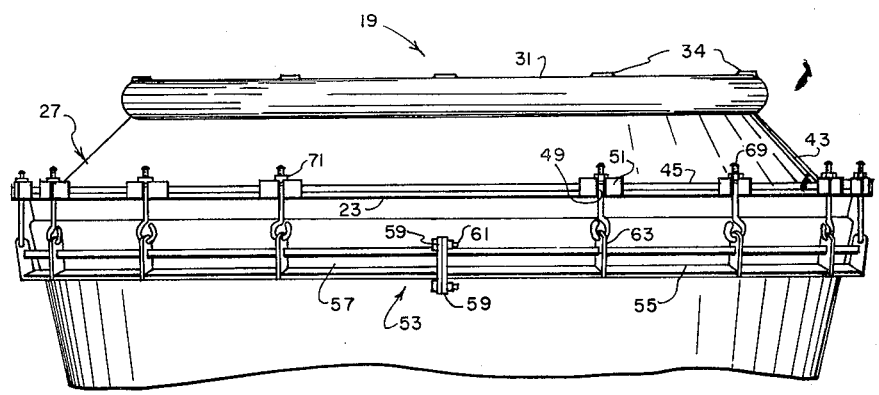
FIG. 7
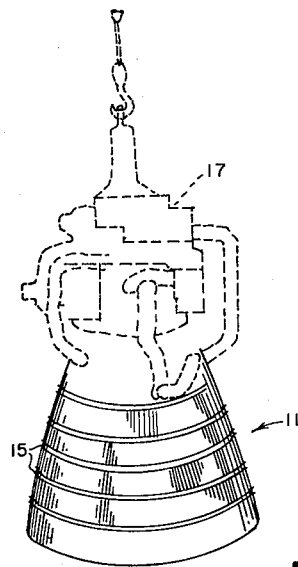
FIG. 10
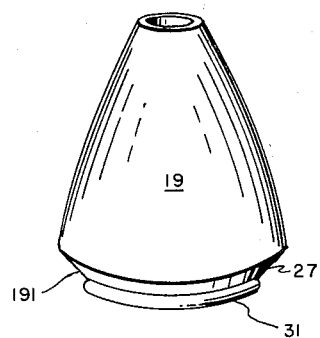
ALFRED ROTMAN,
INVENTOR.
BY
ATTORNEYS July 13, 1965 JAMES E. WEBB 3,194,525
ADMINISTRATOR OF THE NATIONAL AERONAUTICS
AND SPACE ADMINISTRATION
SUPPORTING AND PROTECTING DEVICE
Filed Feb. 7, 1964 5 Sheets-Sheet 5

ALFRED ROTMAN,
*INVENTOR.*

BY

ATTORNEYS 3,194,525
SUPPORTING AND PROTECTING DEVICE
James E. Webb, administrator of the National Aeronautics and Space Administration with respect to an invention of Alfred Rotman
Filed Feb. 7, 1964, Ser. No. 343,425
19 Claims. (Cl. 248—119)

This invention relates generally to equipment for facilitating the assembly, handling, storing and shipping of engines and the like and more particularly to such equipment for protecting, supporting and strengthening an engine of the type having an open chamber such as the thrust chamber of a rocket engine.

From the early stages of manufacture to final installation, the engines which propel missiles and space vehicles are ever being moved. This movement may range from a slight change in position to a shipment of thousands of miles. Since the precision of these engines must not be disturbed, it is required that during movement thereof means be provided to protect them from excessive shock and undesirable load concentrations.

Typically, the engines used in rockets and missiles include at one end an open diverging thrust chamber having the general configuration of a bell. With its relatively thin shell, and hollow interior, the thrust chamber is especially vulnerable to puncturing, denting, warping and other deformation. Thus, to properly protect the engine during manufacture, movement and storage, its entire thrust chamber must be particularly strengthened and supported.

Containers for protecting engines and other objects during shipping are conventional, and are available in various forms including open frame crates and air tight enclosures. These previous containers, however, fail to provide convenient and adequate protection for engines which feature a thrust chamber. In attempting to adapt existing containers to engines of this type additional objections such as difficulty of assembly and disassembly, lack of ready reusability, and undue bulk and weight are presented.

The present invention provides an improved rig for protecting an engine during manufacture, handling, shipping or storing, from hazards such as excessive shock, puncturing and undesirable load concentrations.

An important aspect of the invention is the provision of a convenient, readily reusable and highly efficient device for preventing damage to the thrust chamber of an engine by strengthening and supporting the entire thrust chamber when the engine is being worked on, moved, installed or stored. This device is so designed that it does not interfere with handling or installation of the engine and, therefore, may serve to protect the engine's thrust chamber at virtually all times. When components of the engine are being assembled on the thrust chamber, this protective device may also serve as an upright stand for supporting the complete engine plus additional test equipment.

The invention also provides an easily assembled protective frame structure which substantially surrounds the entire engine, shielding it, and holding it fixed centrally of the protective frame structure. The entire assembly is adaptable for being lifted, as by overhead hooks, or for being seated on a flat surface such as a floor or a trailer.

A unique and beneficial cooperation exists between the protective frame structure and the device which strengthens and supports the thrust chamber.

The invention permits a lighter engine design by eliminating otherwise necessary reinforcing and supporting elements on the engine proper.

The invention comprises a support plug, the main body of which is adapted to be inserted into the open end of an engine thrust chamber and fit snugly against the thrust chamber wall. A collapsible clamp band assembly may be associated with the support plug for embracing the thrust chamber and holding the support plug firmly therein.

In accordance with one aspect of the invention a protective frame structure comprising two separable telescoping sections is provided for surrounding an engine. A cooperative connection arrangement between the protective frame structure and the support plug aids in suspending the engine centrally within the frame structure.

In describing the invention in detail, reference will be made to the accompanying drawings in which:

FIGURE 1 is a perspective view of an engine having a supporting and protecting rig installed thereon, the entire assembly being mounted on a wheeled transporter.

FIGURE 2 is a side elevational view of the assembly mounted on a wheeled transporter.

FIGURE 3 is an end elevational view, with a portion removed, taken in the direction of the arrow in FIGURE 2.

FIGURE 4 is an end view of a portion of the assembly taken along line 4—4 of FIGURE 2.

FIGURE 7 is a view of a portion of the thrust chamber and support plug showing a clamp band assembly which holds the support plug within the thrust chamber.

FIGURE 10 is a view illustrating a method of installing the support plug within an engine thrust chamber.

Referring now to FIGURES 1 and 2 therein is shown a rocket engine 11, a divergent section of which constitutes a thrust chamber 13. Constructed of a relatively thin metal shell surrounded by longitudinally spaced channel-shaped support bands 15, the thrust chamber 13 is hollow throughout its length and is therefore especially liable to damage from puncturing, warping, denting, and other deformation when not provided with interior support. Near its convergent end portion the thrust chamber 13 is united with combustion section 17 of the engine. Since the novelty of this invention does not embrace the combustion section of the engine, the details of this section will not be described or illustrated.

Figure 5:
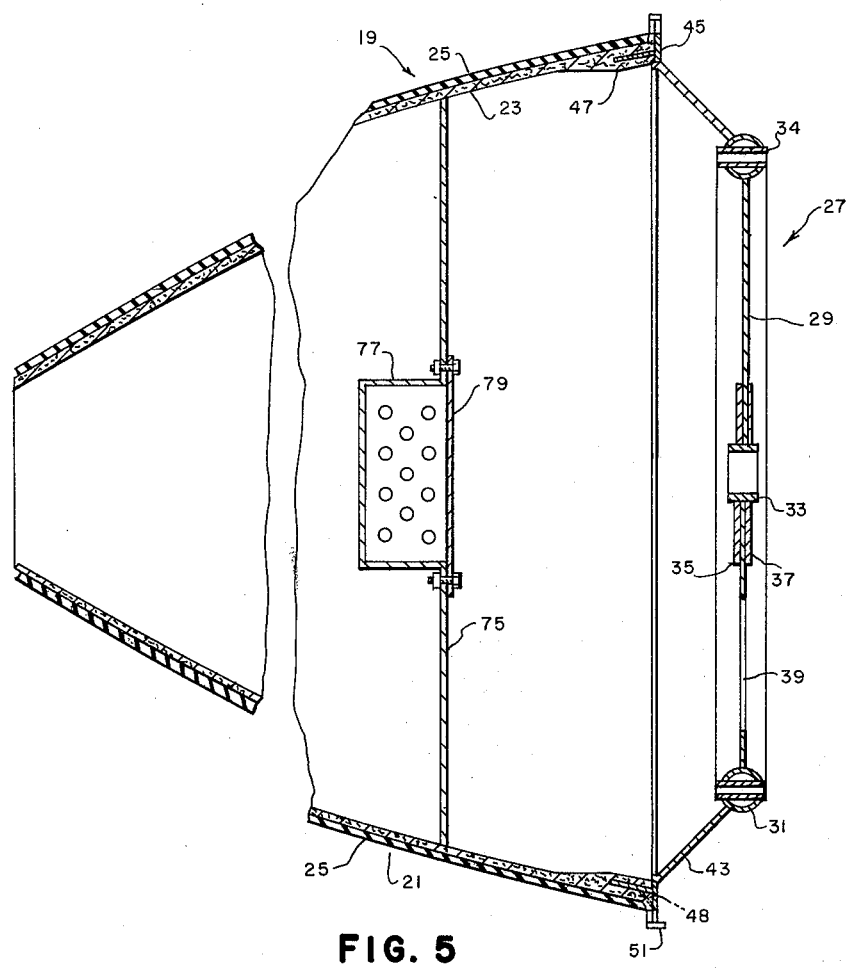
FIGURE 5 is a broken cross-sectional view of a plug which is adapted to be inserted in the thrust chamber of an engine.

Within the thrust chamber 13 in FIGURE 1 is a support plug 19. As seen in FIGURE 5, the support plug 19 comprises a lightweight, hollow, cone-shaped unit having a body 21 which conforms to the shape of the thrust chamber 13. The body 21 comprises a shell 23 made of a somewhat yieldable yet relatively rigid material such as Fiberglas. The outer surface 25 of the body 21 is preferably a soft elastic material such as foam rubber which will cushion and seal against the inner wall of the thrust chamber when inserted therein. The elastic surface material may be adhesively attached as a layer to the shell 23 with an appropriate cementing substance 24.

A base 27 of the support plug 19 includes a base plate 29 surrounded by a hollow seat ring 31. A connecting tube or bushing 33 is located at the center of the base plate 29, and circumferentially spaced tubular bushings 34 are disposed in the seat ring 31. These bushings are provided to receive supporting and connecting elements such as support bearings, shafts and pins which may be employed in handling and supporting the engine during the manufacturing, shipping and installation processes. The base plate 29 is reinforced in the region of the connecting tube or bushing 33 by plates 35 and 37. Openings 39 are formed in the base plate 29 for ventilation and access to the interior of the support plug.

Figure 6:
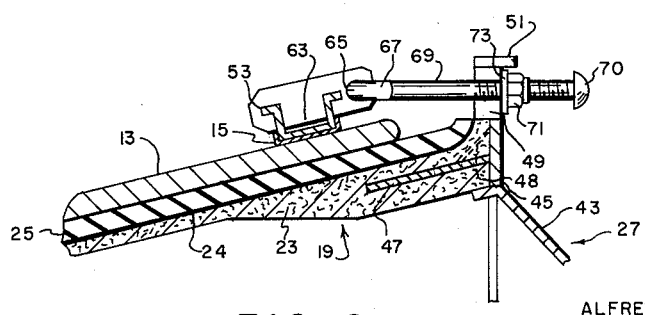
FIGURE 6 is an enlarged fragmentary cross-sectional view of the plug of FIGURE 5 secured within an engine thrust chamber.

Joined to and extending divergently from the seat ring 31 toward the body 21 of the support plug is a transition section 43 which is in the form of a truncated cone. A circumferential flange 45, the details of which are described below, is connected to the section 43. The connection between the base 27 of the support plug and the body 21 is accomplished by the divergent end portion of the Fiberglas shell 23 being moulded around a band 47 which band is joined to the circumferential flange 45. For strengthening purposes, regularly spaced triangular shaped ribs 48 (see FIGURE 6) are secured to the circumferential flange 45 and the band 47. All of the components of the base 27 are preferably made of a light metallic material such as aluminum alloy. The connections between the various base components is most effectively and conveniently done by welding.

As shown in FIGURES 1 and 3, regularly spaced slots 49 open and extend inwardly from the outer edge of the circumferential flange 45. Secured on each side of each slot opening is a retaining plate 51 (see FIGURE 6). The plates 51, the function of which will be explained hereinafter, need be only slightly longer than the width of slots 49 and should extend in width slightly beyond both surfaces of the circumferential flange 45.

For securing the support plug 19 within the thrust chamber 13 a clamp band 53 is employed around the thrust chamber 13 near its divergent end. The clamp band 53 comprises two semicircular sections 55 and 57 (see FIGURE 7) each being substantially hat-shaped in cross section and each having coupling plates 59 welded to the ends thereof. To ensure against slippage of the clamp band 53, the sections 55 and 57 are positioned within the channel-shaped support band 15 nearest the divergent end of the thrust chamber. The sections 55 and 57 may be quickly assembled and disassembled by means of connecting bolts 61 disposed in registering apertures formed in coupling plates 59. Shims (not shown) may be positioned if needed between the coupling plates 59 so that the clamp band 53 fits snugly on the surface of the thrust chamber support band 15.

Clips 63 (see FIGURE 6) are fixed to the clamp band 53 and spaced so as to correspond with the slots 49 of the flange 45. Each clip 63 has a hole 65 therein which receives a looped end portion 67 of an eye bolt 69. The shank of each eye bolt 69 is threaded and carries a nut 71 and a washer 73. To prevent removal from the eye bolt of the nut and washer the end opposite the loop 67 may be upset at 70 as by peening.

When securing the support plug within the thrust chamber the clamp band sections 55 and 57 are assembled in a support band 15 around the thrust chamber near its divergent end. The eye bolts 69 are quickly and easily positioned in their respective slots 49 with the washers 73 bearing on the outer or exposed surface of the circumferential flange 45. The eye bolts may be positioned in the slots 49 either before or after the sections 55 and 57 are joined by the connecting bolts 61.

After the eye bolts are positioned, nuts 71 are tightened, sufficient torque being applied to urge the clamp band 53 firmly against support band 15 of the thrust chamber. The distance between each pair of retaining plates 51 positioned on both sides of each slot 49 is less than the diameter of the washers 73 or nuts 71. This prevents the eye bolts from slipping out of the slots 49 after the nuts 71 are tightened, it being noted previously that the retaining plates extend in width beyond the outer surface of the flange 45.

A quick release of the connection between the support plug 19 and the clamp band 53 may be accomplished by disconnecting the semicircular sections 55 and 57 and lifting them so that the eye bolts are free to fall out of and away from the slots 49. If desired, of course, the support plug may be withdrawn from the thrust chamber immediately upon disconnecting the sections 55 and 57 without waiting for removal of the eye bolts from the slots 49.

As shown in FIGURE 5, the support plug is provided with a transverse wall 75 for sealing off the throat or converging end of the thrust chamber from the atmosphere thereby helping to protect the engine from moisture, dust, and the like. The wall 75 has a perforated box 77 formed therein for containing a desiccant. Access to the interior of the box 77 is had by a removable seal cover 79 which is easily reached through openings 39 in the base plate 29.

The engine 11 is contained within a protective frame structure 81 which is constructed basically of circular rib components of tubular cross section connected in spaced relationship by straight tubular bracing components. The frame 81 comprises two separable sections 83 and 85. The section 83 includes identical laterally spaced tubular brace members 87 each having fixed at one end thereof a pair of opposed sockets 89 and 91. Fixed near the other end of each tubular member 87 is another pair of opposed sockets 93 and 95. Each of the sockets on each member 87 receives an end of a semicircular tubular rib member 97 thereby forming spaced rings which encircle the engine. The end portion of members 97 may be formed substantially straight, i.e. uncurved, so they will readily enter the sockets and may be secured within the sockets by bolts 99. Additional brace members 101 and 103 are provided between the upper semicircular members 97 and also between the lower members 97.

Secured around each pair of sockets 89 and 91 by bolts 99 is a connector plate 105. The end portions of each plate 105 are clamped together in double thickness by bolts 107. A threaded studbolt 109 is welded to the double thickness portion of each plate 105 approximately midway between the bolts 107. The circumferential flange 45 has integral lugs 110 (see FIGURE 3) thereon provided with openings 111. These openings 111 receive the studbolts 109 on which nuts are subsequently tightened, thereby fixing the flange 45, and thus the divergent end of the thrust chamber concentrically within the end ring component formed by members 97.

Figure 8:
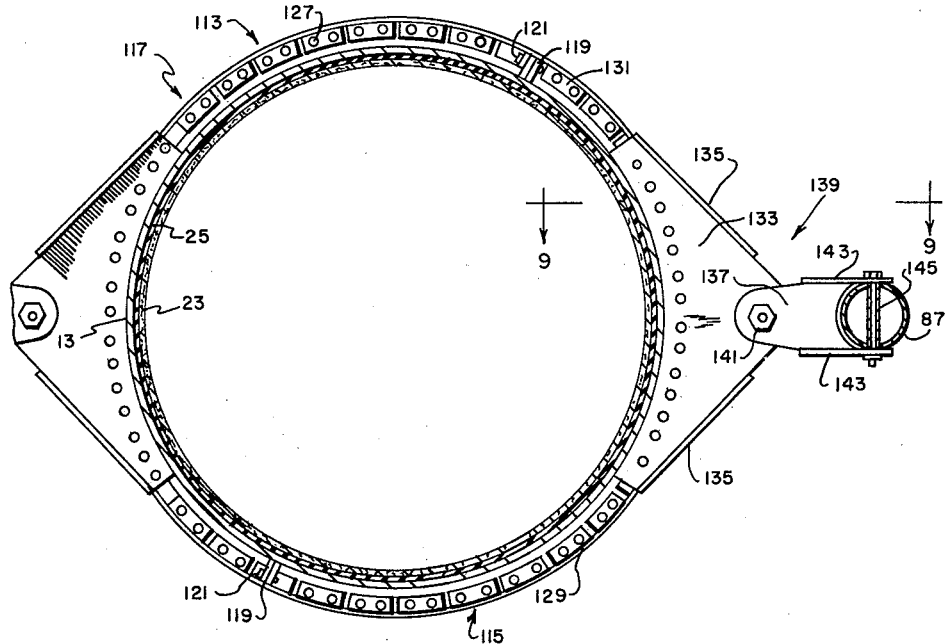
FIGURE 8 is a cross-sectional view taken along lines 8—8 of FIGURE 2.

The middle portion of the engine 11 is firmly held within the protective frame structure 81 by providing a band 113 around the thrust chamber and connecting the band 113 to each of the opposed tubular members 87. As shown in FIGURE 8, the band 113 comprises two semicircular sections 115 and 117 which are provided with end coupling plates 119 connected by bolts 121, and may be quickly assembled and disassembled in a manner similar to the sections 55 and 57 of clamp band 53.

Figure 9:
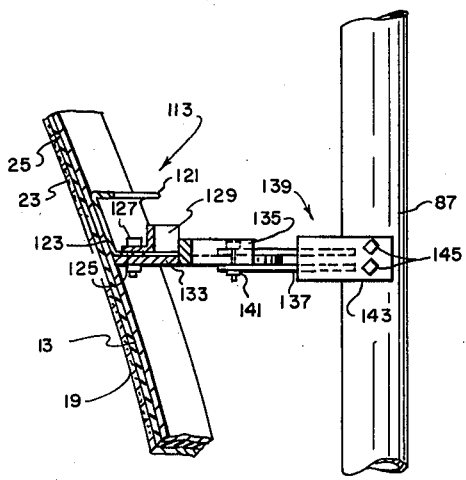
FIGURE 9 is a cross-sectional view taken along lines 9—9 of FIGURE 8.

A cross section of band 113 is shown in FIGURE 9 and includes a generally channel-shaped element 121 with its base 123 inclined so as to correspond with the surface of the thrust chamber. Connected to the inner surface of the channel flange 125 by bolts 127 is an angle member 129. Reinforcing strips 131 may be secured also by bolts 127 to the outer surface of the flange 125. These strips are shown as being relatively short and closely spaced on the flange 125.

Triangular connecting plates 133 are connected to band 113 on opposed sides of the thrust chamber. One side of each plate 133 is concave, conforming to the curvature of band 113. A sufficient number of reinforcing strips 131 are omitted or removed from the band 113 to permit the concave sides of plates 113 to be positioned adjacent flange 125 and connected thereto by the bolts 127. The plates 133 may be provided with stiffeners 135.

Each plate 133 at its corner opposite the concave side is disposed between a pair of spaced plates 137 (see FIGURE 9) of a bracket 139, and connected by bolts 141. Each bracket 139 includes another pair of spaced plates 143 joined to opposite edges of plates 137 and which engage tubular members 87, being connected to the tubular members by bolts 145.

Midway between the ends of each lower and upper semicircular member 97 supports 149 and 150, respectively, are secured as by welding. The supports 149 provide a flat base surface for the protective frame 81, and the supports 150 provide a convenient surface on top of the frame for bolting socketed connectors 153. The ends of a tubular member 155 are received in the sockets of connectors 153.

The section 85 of the protective frame 81 comprises two opposed tubular members 157, each having at one end a pair of sockets 93 and 95. Within these sockets the ends of a pair of semicircular members 97 are secured by bolts 99. Respective supports 149 and 150 are secured midway between the ends of these members 97.

A tubular member 159 is welded on the top support 150 and projects telescopically into the tubular member 155 (see FIGURE 2). The tubular members 157 have reduced diameter end portions 158 which fit telescopically within respective tubular members 87. Each of the telescoping connections is held by transversely extending bolts 160.

Welded at right angles at the end of the tubular member 159 is a tubular member 161 which extends downwardly toward the axial center of the frame 81 (see FIGURES 2 and 4). To the lower end of the member 161 a connecting lug 163 is joined. This connecting lug 163 is clamped between an adapter ring 165 and a plate 167 which carries an apertured handling lug 169. A pedestal 168 has a circular portion 171 the end of which is reduced in diameter to fit within the adapter ring 165. This results in a shoulder on the pedestal bearing against the adapter ring 165. Clamp bolts 122 extend through the plate 167 and into the pedestal 168, clamping the pedestal to the lug and against adapter ring 165.

The pedestal 171 has plug 173 which mates within a socket of an adapter 174 secured to the end of the engine 11.

It is understood from the foregoing that the engine 11, with the support plug therein, may be installed within section 83 of the protective frame 81 and, subsequently, the section 85 may be quickly joined telescopically to section 83 while automatically effecting a plug and socket connection between the engine and the section 85.

To facilitate handling of the engine and frame assembly a bar 175, carrying a lifting lug 177, is mounted on the tubular member 155. The bar 175 has a number of holes spaced along its length to permit desired balancing of the assembly when it is lifted.

A handling trailer 179 includes spaced I-beam rails 181 connected to cross beam channels 183. Front and rear axles 185 extend between rails 181, and at the ends of the axles wheels 187 are pivotally mounted at 189. The flat web surfaces of the channels 183 face upwardly for receiving the bottom supports 149 of the frame structure 81. Cross beams 183 are spaced so as to correspond with the spacing of suports 149. Bolted connections 184 may be made between supports 149 and cross beams 183 for holding the assembly securely on the handling trailer.

The spacing between the rails 181 is approximately equal to the external diameter of the circumferential flange 45. The cross beams 183 are positioned on the under side of the rails 181 thereby making the center of gravity of the frame and engine assembly lower with respect to the floor as it rests on cross beams 183.

FIGURE 10 illustrates a method of installing the support plug 19 within the thrust chamber of the engine 11. The support plug stands on its base 27 and the engine is lowered by a lifting hook while the thrust chamber is guided so as to receive the support plug in a proper fit. The elastic surface of the support plug will compress slightly, and resiliently press against the inner wall of the thrust chamber. Therefore, the engine can then be lifted and the support plug will remain within the thrust chamber even though the clamp band 53 has not been applied.

However, the clamp band 53 and the protective frame structure 81 may conveniently be applied when the engine is in the upright position resting on the support plug 19, owing to the truncated cone configuration of the support plug base 27. The base configuration results in a working access space 191 being provided between the floor or platform on which the support plug rests and the circumferential flange 45, permitting easy installation of the clamp band 53. This access space also provides ample room for allowing the end of the protective frame structure 81 to be connected to the circumferential flange 45 of the support plug base through connecting plates 105.

During assembly of component parts of the engine on the thrust chamber the support plug 19, resting on its base 27, may be used as an upright stand for the thrust chamber while protecting it from damage. The support plug may remain within the thrust chamber after assembly of the engine and during subsequent handling thereof.

For shipping, the entire engine and protective frame assembly may be suspended within a metal shipping container (not shown). The suspension connections between the assembly and the container may be applied to the tubular elements of the frame 81 as appropriate. The connecting tube or bushing 33, located at the reinforced center of the support plug base 27, is available for making suspension connections during shipping and/or installation of the engine.

Obviously numerous modifications and variations of the present invention are possible in the light of the above teaching. It is, therefore, to be understood that within the scope of the appended claims the invention may be practiced otherwise than as specifically described therein.

What is claimed is:

1. A support plug for internally supporting an engine thrust chamber, comprising:
   (a) a body having a configuration corresponding to the configuration of said thrust chamber and adapted for insertion therein;
   (b) a base adjacent one end of said body;
   (c) said base including a base plate having a centrally located connecting tube and openings therein for access to the interior of said support plug;
   (d) said base plate being spaced from said end of said body and connected to said body through a transition member in the form of a truncated cone;
   (e) a seat ring being interposed between said base plate and said transition member.

2. A support plug for internally supporting an engine thrust chamber comprising:
   (a) a hollow body having a configuration corresponding to the configuration of said thrust chamber and adapted for insertion therein;
   (b) a base adjacent one end of said body;
   (c) said base extending from said end of said body and terminating in a seating surface for said support plug;
   (d) said seating surface encompassing less cross sectional area than that encompassed by said end of said body thereby providing a working space under said body when the support plug is positioned upright on said seating surface;
   (e) the hollow interior of said body being separated by a transverse wall for sealing off the interior of the thrust chamber from the atmosphere;
   (f) said transverse wall incorporating a perforated desiccant container and a removable cover therefor.

3. A support plug for internally supporting an engine thrust chamber, comprising:
   (a) a hollow conical body adapted for insertion into said thrust chamber;
   (b) said body including a relatively thin conical shell;
   (c) a layer of elastic material substantially covering said shell and being bonded thereto.

4. A support plug as defined in claim 3 wherein said shell is made of Fiberglas and said elastic material is foam rubber.

5. A support plug, comprising:
   (a) a hollow conical body;

(b) said body having a relatively thin conical shell substantially covered by a layer of elastic material bonded thereto;
(c) a circumferential flange attached to the divergent end of said body and projecting laterally beyond said body;
(d) circumferentially spaced slots formed in said flange;
(e) a base plate connected to said flange and spaced outwardly therefrom;
(f) said base plate encompassing less cross sectional area than that encompassed by said flange.

6. A support plug as defined in claim 5 wherein the hollow interior of said body is separated by a transverse wall for sealing off the interior of the thrust chamber from the atmosphere.

7. In combination with the thrust chamber of an engine:
(a) a support plug having a body of a configuration corresponding to the configuration of said thrust chamber;
(b) said body being disposed within said thrust chamber with the exterior surface of said body contacting the interior surface of said thrust chamber substantially throughout the length of said thrust chamber;
(c) a flange abutting one end of said body and projecting laterally beyond said body and said thrust chamber;
(d) attachment means mounted on the exterior surface of said thrust chamber adjacent said flange;
(e) means connecting said attachment means and said flange thereby holding said support plug within said thrust chamber.

8. The combination of claim 7 wherein said attachment means comprises a clamp band embracing said thrust chamber and clips circumferentially spaced around said clamp band and wherein said connecting means comprises bolts pivotally connected to said clips.

9. The combination as defined in claim 8 wherein said clamp band comprises separate sections releasably joined end to end whereby release of said joints permits withdrawal of said support plug from said thrust chamber.

10. In combination with the thrust chamber of an engine:
(a) a support plug having a body of a configuration corresponding to the configuration of said thrust chamber;
(b) said body being disposed within said thrust chamber with the exterior surface of said body contacting the interior surface of said thrust chamber substantially throughout the length of said thrust chamber;
(c) said plug comprising a base at one end thereof extending outwardly of said thrust chamber and terminating in a seating surface for said support plug;
(d) said seating surface encompassing less cross sectional area than said end of said body.

11. In combination with the thrust chamber of an engine:
(a) a support plug having a body of a configuration corresponding to the configuration of said thrust chamber;
(b) said body being disposed within said thrust chamber with the exterior surface of said body contacting the interior surface of said thrust chamber;
(c) a circumferential flange secured to one end of said body and projecting laterally beyond said body and said thrust chamber;
(d) circumferentially spaced slots formed in said projecting portion of said flange;
(e) a clamp band surrounding said thrust chamber;
(f) clips secured to said clamp band and spaced therearound in alignment with said slots in said circumferential flange;
(g) a bolt pivotally connected to each of said clips and extending through said aligned slot in said circumferential flange;
(h) means bearing on said circumferential flange for inducing tension in said bolts between said clips and said flange thereby clamping said band tightly against said thrust chamber.

12. The combination of claim 11 wherein said clamp band comprises separate sections releaseably joined end to end whereby release of said joints permits withdrawal of said support plug from said thrust chamber.

13. A frame for supporting and protecting an engine, comprising:
(a) a plurality of spaced axially aligned rings connected by brace members extending therebetween;
(b) an end section of said frame being telescopically separable from the remainder of said frame;
(c) said separable section comprising one of said rings;
(d) said separable section carrying a connecting means fixed substantially in axial alignment with said rings;
(e) said connecting means being adapted for automatically effecting a connection between said frame and the end of an engine when said separable section is telescopically joined to the remainder of said frame.

14. A frame as defined in claim 13 wherein said connecting means comprises a connecting plug adapted for entering a socket in the end of an engine.

15. In combination with an engine having a thrust chamber, a rig for supporting said engine, comprising:
(a) a support plug having a body of a configuration corresponding to the configuration of said thrust chamber;
(b) said body being disposed within said thrust chamber with the exterior surface of said body contacting the interior surface of said thrust chamber substantially throughout the length of said thrust chamber;
(c) a flange secured to one end of said body and projecting laterally beyond said body and said thrust chamber;
(d) attachment means mounted on the exterior surface of said thrust chamber adjacent said flange;
(e) means connecting said attachment means and said flange thereby holding said support plug within said thrust chamber;
(f) a protective frame surrounding said engine;
(g) means for rigidly suspending said engine within said frame;
(h) said means including means connecting said flange to said frame.

16. The combination of claim 15 wherein said attachment means comprises a clamp band embracing said thrust chamber.

17. In combination with an engine having a thrust chamber, a rig for supporting said engine, comprising:
(a) a support plug having a body of a configuration corresponding to the configuration of said thrust chamber;
(b) said body being disposed within said thrust chamber with the exterior surface of said body contacting the interior surface of said thrust chamber;
(c) a flange secured to an end of said body and projecting laterally beyond said body and said thrust chamber;
(d) attachment means mounted on the exterior surface of said thrust chamber adjacent said flange;
(e) menas connecting said attachment means and said flange thereby holding said support plug within said thrust chamber;
(f) a protective frame encircling said engine;
(g) said frame comprising a plurality of spaced axially aligned rings connected by brace members extending therebetween;
(h) means for rigidly suspending said engine within said frame centrally of said axially aligned rings;

(i) said means including a connection between said flange and one of said rings at one end of said frame;

(j) said means further including a plug and socket connection between said frame and said engine at the other end of said frame;

(k) a section of said frame comprising said other end thereof being telescopically separable from the remainder of said frame.

18. The combination as defined in claim 17 wherein said support plug includes a base seating surface spaced from said end of said body and said one end of said frame in substantially axial alignment with said body and said frame; said seating surface encompassing less cross sectional area than said end of said body thereby providing working space for effecting said connection between said flange and said ring when said support plug is positioned upright on said seating surface.

19. An engine having a thrust chamber;

(a) a support plug inserted in said thrust chamber with the exterior surface of said support plug contacting the interior surface of said thrust chamber;

(b) a protective frame encircling said engine;

(c) said frame comprising a plurality of spaced axially aligned rings connected by brace members extending therebetween;

(d) means for rigidly suspending said engine within said frame centrally of said axially aligned rings;

(e) said means including a connection between said support plug and said frame;

(f) supports attached to said frame;

(g) a wheeled transporter comprising spaced longitudinal rails and transverse cross members;

(h) said transverse members being connected to said rails and disposed in a plane below the transverse plane between said rails;

(i) said frame and said engine resting on said transporter with said supports bearing on said transverse cross members;

(j) a portion of said rings and said thrust chamber extending below the upper surfaces of said rails.

References Cited by the Examiner

UNITED STATES PATENTS

| | | | |
|---|---|---|---|
| 1,773,237 | 4/30 | Naujoks et al. | 248—121 |
| 2,409,468 | 10/46 | Bock | 269—17 |
| 2,445,453 | 7/48 | Pennington | 304—2 |
| 2,594,586 | 4/52 | Ries | 248—13 X |
| 2,732,936 | 1/56 | Lankford | 206—46 |
| 2,809,746 | 10/57 | Lankford | 206—46 |
| 2,893,163 | 7/59 | Hazel | 248—346.1 |
| 2,928,535 | 3/60 | Simmons et al. | 206—46 |
| 3,014,740 | 12/61 | Bogosian et al. | 248—2 |

FOREIGN PATENTS

| | | |
|---|---|---|
| 1,016,740 | 9/52 | France. |
| 26,073 | 2/32 | Netherlands. |

FRANK L. ABBOTT, *Primary Examiner.*